(12) United States Patent
Merk

(10) Patent No.: US 8,984,163 B2
(45) Date of Patent: Mar. 17, 2015

(54) METHOD FOR CREATING A COMMUNICATION NETWORK FROM DEVICES OF AN AUTOMATION SYSTEM

(75) Inventor: Stephan Merk, München (DE)

(73) Assignee: Siemens Aktiengesellschaft, Munich (DE)

( * ) Notice: Subject to any disclaimer, the term of this patent is extended or adjusted under 35 U.S.C. 154(b) by 172 days.

(21) Appl. No.: 13/424,919

(22) Filed: Mar. 20, 2012

(65) Prior Publication Data

US 2012/0246341 A1 Sep. 27, 2012

(30) Foreign Application Priority Data

Mar. 24, 2011 (EP) ..................................... 11159616

(51) Int. Cl.
*G06F 15/173* (2006.01)
*H04L 12/28* (2006.01)
*H04L 29/12* (2006.01)
*H04L 29/08* (2006.01)

(52) U.S. Cl.
CPC .......... *H04L 61/103* (2013.01); *H04L 67/1065* (2013.01); *H04L 67/12* (2013.01)
USPC .......................................... 709/243; 370/254

(58) Field of Classification Search
USPC ......................................................... 709/243
See application file for complete search history.

(56) References Cited

U.S. PATENT DOCUMENTS 6,909,700 B1 * 6/2005 Benmohamed et al. ...... 370/255
7,865,707 B2 * 1/2011 Bittlingmayer et al. .......... 713/1

(Continued)

FOREIGN PATENT DOCUMENTS

| CN | 101114257 | 1/2008 |
|---|---|---|
| CN | 101582109 | 11/2009 |
| CN | 101803341 | 8/2010 |
| DE | 102 29 636 | 1/2004 |

(Continued)

OTHER PUBLICATIONS

Ion Stoica et al: "Chord: A Scalable Peer-to-Peer Lookup Protocol for Internet Applications" IEEE/ACM Transactions on Networking, IEEE/ACM, New York, NY, US Bd. 11, Nr. 1, Feb. 1, 2003, XP011077215; Others.

(Continued)

*Primary Examiner* — Emmanuel L Moise
*Assistant Examiner* — Mahran Abu Roumi
(74) *Attorney, Agent, or Firm* — Cozen O'Connor

(57) ABSTRACT

A method for creating a communication network from devices of an automation system, wherein the automation system is developed based on logical addresses of the devices and the devices are assigned physical addresses by which the devices are accessed to exchange data over the communication network when operating the automation system. An overlay network comprising a decentralized network is constructed with the devices as network nodes, wherein conventional mechanisms for decentralized networks for publication of resources and subscription to resources are used to map logical addresses used during development of the automation system to the physical addresses used when operating the automation system. Mapping is achieved by a resource or a subscription to a resource being suitably published during initialization of a respective device, wherein the resources are stored based on keys in the decentralized network which corresponds to a logical addresses, and the resource contents represent physical addresses.

18 Claims, 3 Drawing Sheets

(56) References Cited

U.S. PATENT DOCUMENTS

| | | | |
|---|---|---|---|
| 7,975,291 B2* | 7/2011 | Amamiya et al. | 726/6 |
| 2005/0060429 A1* | 3/2005 | Massoulie et al. | 709/243 |
| 2005/0256927 A1 | 11/2005 | Schlereth | |
| 2007/0073426 A1* | 3/2007 | Chand | 700/87 |
| 2008/0046142 A1* | 2/2008 | Jordan et al. | 701/36 |
| 2009/0119386 A1 | 5/2009 | Busser et al. | |
| 2010/0303089 A1 | 12/2010 | Gerdes et al. | |
| 2012/0166556 A1* | 6/2012 | Kim et al. | 709/206 |
| 2013/0265908 A1* | 10/2013 | Lessmann et al. | 370/254 |

FOREIGN PATENT DOCUMENTS

| | | |
|---|---|---|
| DE | 10 2006 021 591 | 4/2007 |
| DE | 10 2006 052 451 | 1/2008 |
| WO | WO 2008/120120 | 10/2008 |
| WO | WO 2009/037074 | 3/2009 |

OTHER PUBLICATIONS

Eugster Patrick TH et al: "The Many Faces of Publish/Subscribe", ACM Computing Surveys, ACM, New York, NY, US, US, Bd. 35, Nr. 2, Jun. 1, 2003, Seiten 114-131; Book (18 pages).

* cited by examiner

METHOD FOR CREATING A COMMUNICATION NETWORK FROM DEVICES OF AN AUTOMATION SYSTEM

BACKGROUND OF THE INVENTION

1. Field of the Invention

The present invention relates communication networks and, more particularly to a method for creating a communication network from devices of an automation system and to a corresponding communication network and a corresponding automation system.

2. Description of the Related Art

The configuration or reconfiguration of automation systems in production or process automation is complex, time-consuming and associated with high cost. Within the framework of engineering, the automation system is usually planned first and then its automation is designed. In such cases, the communication infrastructure between the individual devices of the automation system must also be planned. A device of an automation system is to be understood here and below as any given units which are involved as part of the automation system in automating the system or in the associated communication. Preferably, the devices comprise sensors and actuators in the field and also controllers which, based on data from sensors, control corresponding actuators in a suitable manner.

It is known to use various protocols for communication between the individual devices of the automation system. To guarantee real time exchange of data between the devices, a communication network is established in particular which is based on Industrial Ethernet. In such cases, there are a plurality of known communication protocols that are based on the use of Industrial Ethernet, such as the Profinet protocol. Within the framework of communication during operation of the automation system, corresponding physical addresses, such as IP addresses and Media Access Control (MAC) addresses, for example, are used in which the individual devices are addressed directly. Within the framework of the engineering of automation systems, it is further known that for the generic description of automation functions, instead of physical addresses, corresponding logical addresses of the individual devices are used. The problem arises, at run time or when the automation systems is started up, of the logical addresses having to be converted in a suitable manner into physical addresses of the devices, in order in this way to guarantee the real time capabilities of system operation. At present, there are no known methods that guarantee in a simple manner, with the least possibly manual effort, an assignment of the logical addresses to the physical addresses of the devices.

SUMMARY OF THE INVENTION

It is therefore an object of the invention to provide a method for creating a communication network from devices of an automation system with which logical addresses used within the framework of the engineering of the automation system can be converted in a simple manner into physical addresses that are used during the operation of the automation system.

This and other objects and advantages are achieved in accordance with the invention by a method that is used to create a communication network from devices of an automation system, where the automation system is assigned based on logical addresses of the devices and where the devices are assigned physical addresses with which the devices are addressed for the exchange of data over the communication network during operation of the automation system. The term creation of a communication network is to be understood here and below as a wide-ranging term and not only relates to the original initialization of the communication network but also to the reconfiguration of the communication network during the initialization of new devices or the initialization of replacement devices.

In accordance with the contemplated embodiments of the method in accordance with the invention, a (logical) overlay network is constructed between the devices in the form of a decentralized network. Here, the term decentralized network includes any type of peer-to-peer network. In this decentralized network, each device of the automation system represents a network node that is responsible for a number of keys, where resources that are specified by a respective key assigned the resource and a resource content are specified in the decentralized network, as well as subscriptions to resources that are specified by a respective key assigned to the resource and a subscribing device, can be published. The publication is undertaken in such cases such that, at that network node which is responsible for the key of a resource, the resource or a subscription to the resource is published, where during a subscription to a resource the subscribing device is informed in the publication of a resource with the key of the subscription about the resource content.

In accordance with the disclosed embodiments of the invention, a decentralized network between the devices is thus established in a known manner, where this decentralized network provides the known mechanisms from the prior art for publishing or for subscribing to resources. The mechanism as to how the corresponding resource content reaches the subscribing network node within the framework of a subscription can be developed in different ways in such cases. In particular, the resource content can be transferred immediately with a corresponding notification after publication of the resource. Likewise, there is the option of information only being provided within the framework of notification to the subscribing network node about the publication of the resource, in response to which the network node then automatically searches for the resource and receives the resource content as a search result.

The disclosed embodiments of the method in accordance with the invention uses the mechanisms described above of a decentralized overlay network in a suitable manner to make known the physical addresses between the devices. This occurs as part of the initialization of the individual devices. In such cases, a device is accepted during its initialization into the decentralized network and functions as a first and/or second device where, during the operation of the automation system, data at a first device is to be sent to a second device or data is to be retrieved at a second device for a first device by the communication network (i.e., in communication based on corresponding physical addresses). Within the framework of sending data, an autonomous transfer of the data to the second device is undertaken by the first device or by a unit assigned to this device. Within the framework of fetching of the data, the data is retrieved from another second device by a first device or by a unit assigned to the first device.

In accordance with the disclosed embodiments of the method in accordance with the invention, during the initialization of a first device, a subscription to a resource with the logical address as key and the first device as subscribing device is published, where the second device to which the data is to be sent or the data of which is to be retrieved, publishes during its initialization a resource with the same logical address as key as the logical address in accordance with the subscription to the resource during the initialization of the first device and with the physical address of the second device. The term initialization of the device has a wide-ranging meaning and can in this case relate to the switching-on of a device already present in the communication network or to the inclusion of a new device in the communication network or also to the acceptance of a replacement device on failure of another device in the communication network.

With the publication of a subscription or of a resource described above, it is ensured in a suitable manner that physical addresses based on logical addresses are made known in a suitable way between a first and a second device between which data is to be transmitted. Here, the mapping of logical addresses used during the engineering of the system to physical addresses is achieved with the mechanisms known from decentralized overlay networks.

In a preferred embodiment of the method in accordance with the invention, the first device publishes during its initialization a subscription to a resource with its own logical address as key, where the second device to which data on the first device is to be sent or the data of which is to be retrieved for the first device, during an initialization publishes a resource with the logical address of the first device as key and with the physical address of the second device as resource content. The presently contemplated embodiment is especially used if the first device does not know the logical address of the second device.

In a further embodiment, the first device publishes during its initialization a subscription to a resource with the logical address of the second device to which data on the first device is to be sent or of which data (for editing) is to be retrieved for the first device as a key, where the second device during its initialization publishes a resource with its logical address as key and with its physical address as resource content. The presently contemplated embodiment is especially used if the first device knows the logical address of the second device.

In a further preferred embodiment, the subscribing device is specified in a subscription by its corresponding physical address.

In an especially preferred embodiment, the method in accordance with the disclosed embodiments is used in an automation system that comprises a sensor, an actuator and a controller as devices where, during operation of the automation system based on physical addresses of at least some of the devices, sensor data at the sensor is to be sent to the controller or is to be retrieved for the controller and control signals based on the sensor data (outgoing) are to be sent by the controller and especially by the controller to the actuator. Preferably, the controller has a control function in such cases with which, based on sensor data received in the controller, the control signals to be sent to the actuator are determined, where the control function is based on the logical address of the sensor and the logical address of the actuator. Within the framework of the engineering of the automation system, a control function with generic logical addresses is thus used, which is then mapped to physical addresses during creation of the communication network for the operation of the automation system.

In an especially preferred embodiment, the sensor and the controller are initialized for (push) operation, in which the sensor data at the sensor is sent automatically by the sensor or by a unit assigned the sensor, where the sensor during its initialization functions as the first device and publishes a subscription to a resource with its logical address as key, and where the controller functions as a second device and publishes a resource with the logical address of the sensor as key and with the physical address of the controller as resource content.

In a further embodiment, the sensor and the controller are initialized for a (poll) mode in which sensor data at the sensor is retrieved for the controller, where the retrieval is undertaken by the controller or by unit assigned to the controller, preferably at regular intervals. Here, the controller functions during its initialization as the first device and publishes a subscription to a resource with the logical address of the sensor as key. By contrast, the sensor functions as the second device and publishes a resource with its logical address as key and with its physical address as resource content. In the push or poll mode presented above, account is taken of the fact that the controller knows the logical address of the sensor but the sensor does not necessarily have to know the logical address of the controller.

In a further, especially preferred embodiment, the actuator and the controller are initialized for operation in which control signals (outgoing) are sent from the controller to the actuator, where the controller, during its initialization, functions as a first device and publishes a subscription to a resource with the logical address of the actuator as key and where the actuator functions as the second device and publishes a resource with its logical address as key and its physical address as resource content. In the presently contemplated embodiment, the controller or unit assigned the controller automatically sends corresponding control signals to the actuator.

The decentralized network used as the overlay network can be developed as required. In an especially preferred embodiment, a peer-to-peer network based on a distributed hash table is used in this case, especially a conventional chord ring.

Within the framework of communication during operation of the automation system, any given protocols can be used for exchange of data in the communication network. Here, the communication exchange is preferably based on Industrial Ethernet or on Profinet. The physical addresses that are used within the framework of communication during operation of the automation system can, for example, be MAC addresses or IP addresses.

In addition to the above-described embodiments of a method for creating a communication network, the invention further relates to a communication network comprising devices of an automation system, where the automation system is developed based on logical addresses of the devices and where the devices are assigned physical addresses by which the devices are accessed for exchange of data over the communication network during operation of the automation system. Here, the communication network is developed so that it is created in accordance with at least one of the contemplated embodiments of the method in accordance with the invention.

In addition the invention relates to an automation system including a plurality of devices, where the disclosed communication network in accordance with the invention is formed between the devices.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Exemplary embodiments of the invention are explained in detail below with reference to the enclosed drawings, in which an exemplary embodiment of the invention is represented and in which.

DETAILED DESCRIPTION OF THE PREFERRED EMBODIMENTS

Figure 1:
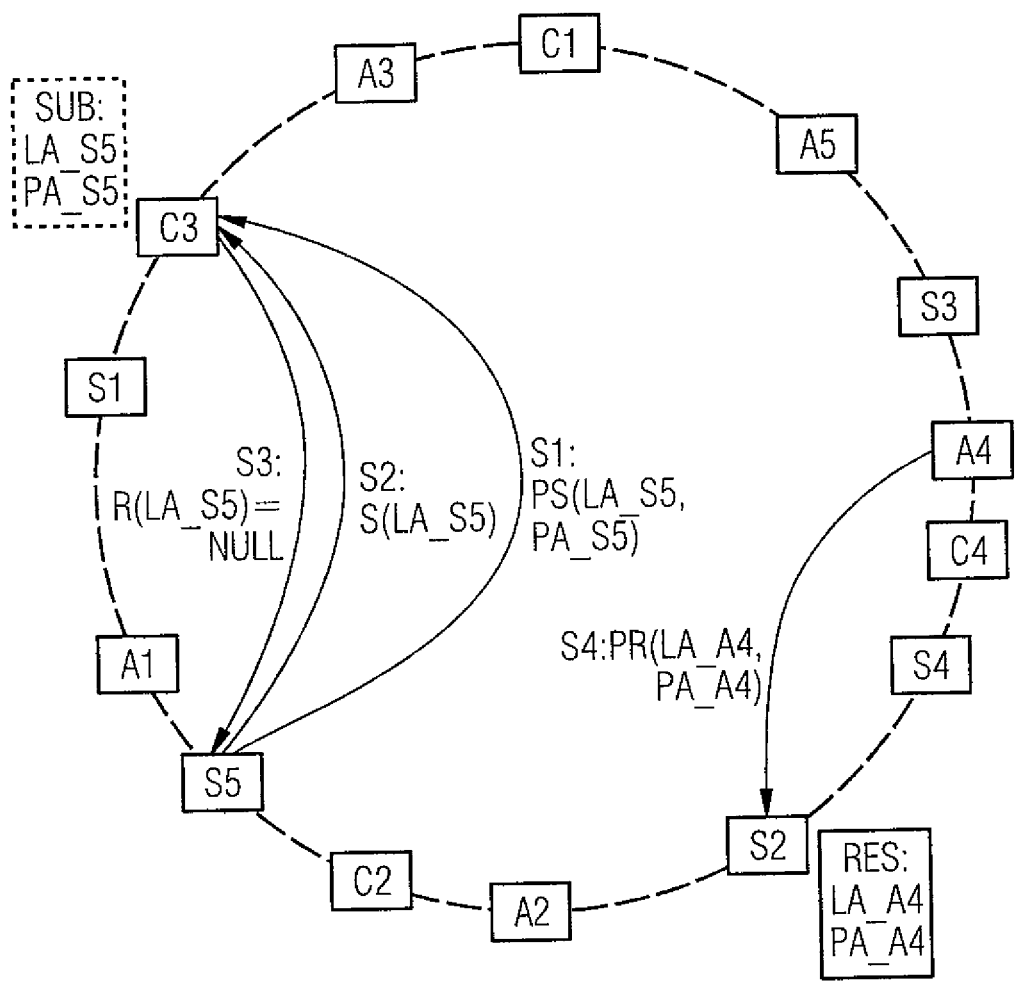
FIGS. 1 to 3 show in a schematic block diagram the execution sequence of an embodiment of the method in accordance with the invention for creating a communication network between devices of an automation system.
Figure 2:
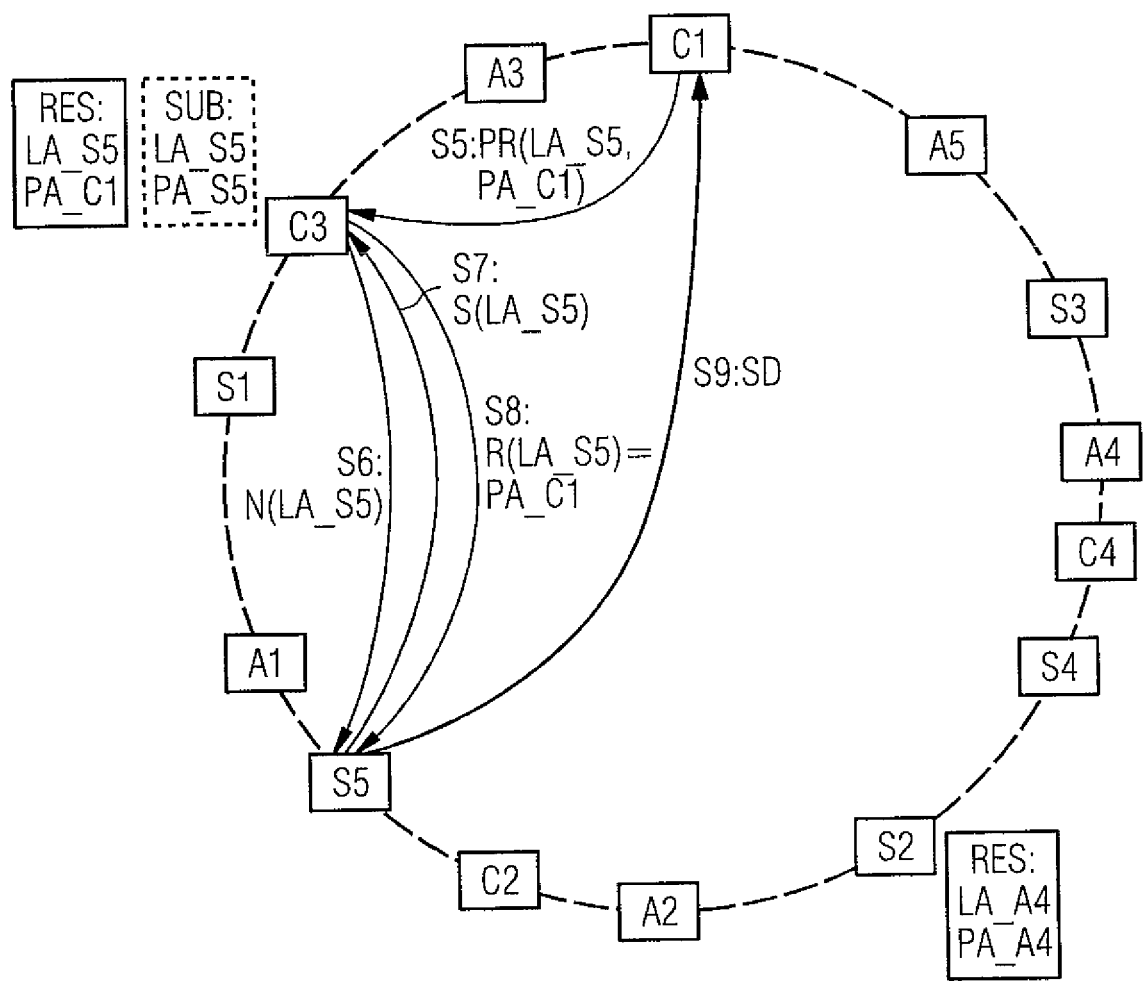
Figure 3:
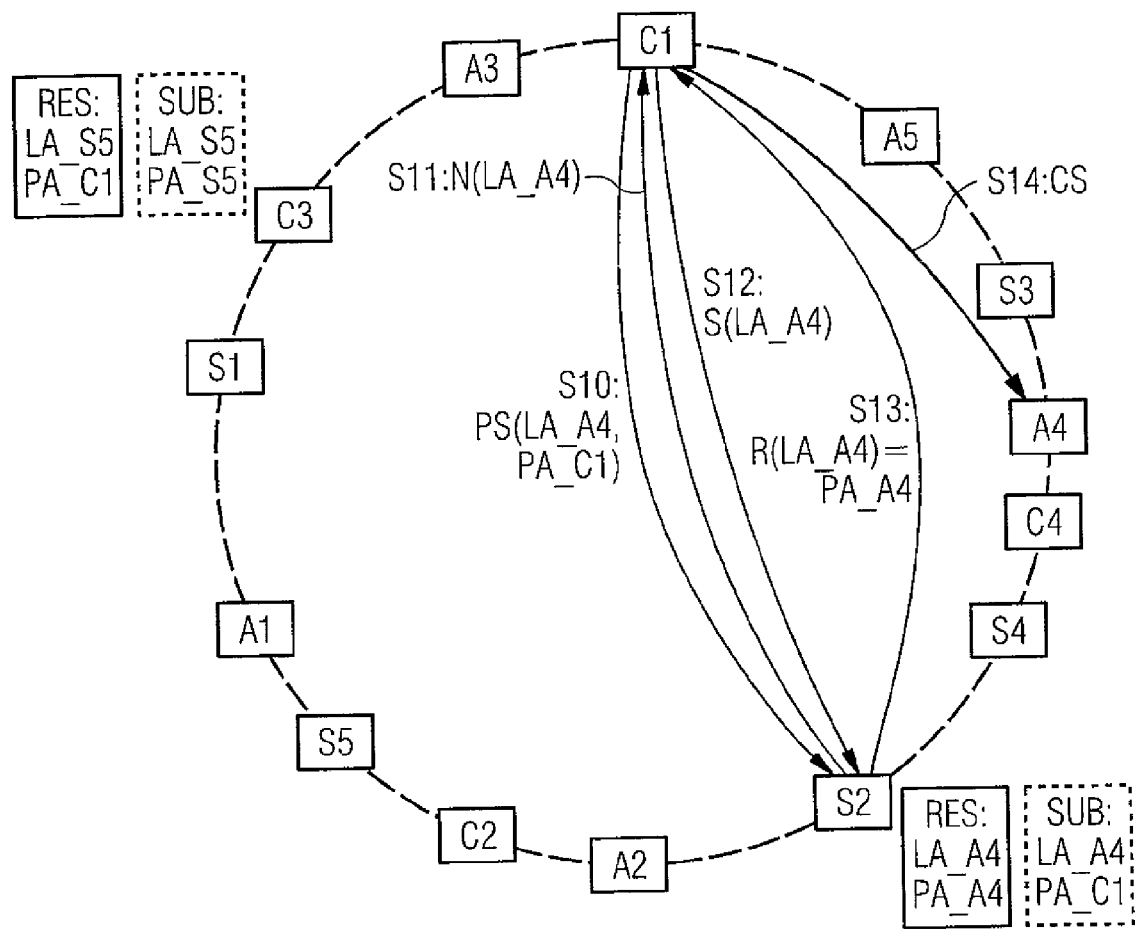

An exemplary embodiment of the invention based on devices of an automation system is described below, between which a peer-to-peer network comprising a conventional chord ring is created as an overlay network. This ring is indicated in FIG. 1 to FIG. 3 by a dashed-line circle, where the individual peers or nodes of the ring are formed by corresponding devices of the automation system. Here, the devices comprise sensors, actuators and controllers. In FIG. 1, for example, the sensors S1, S2, S3, S4 and S5, the controllers C1, C2, C3 and C4 and also the actuators A1, A2, A3, A4 and A5 are depicted. The chord ring is based on a Distributed Hash Table (DHT), with an integer identity range of size $2^m$. This identity range is represented by a closed ring, with each node of the ring representing a corresponding identity from the identification range. Here, each individual node is responsible for an interval of identity values, which are greater than the identity value of their predecessor node and less than or equal to their own identity value. The sequence of the nodes corresponds in the embodiment of FIG. 1 to the clockwise direction.

With per se known mechanisms of the chord ring, resources with corresponding keys can be stored in the individual nodes or published, wherein by the conversion of the key by the hash function into a hash value, an identity value on the chord ring is produced. The network node which is responsible for this identity value is then also responsible for the corresponding resource. As well as the mechanism of publishing resources the mechanism of subscription to a resource is also used in accordance with the invention. Here, a network node can subscribe to a resource with a corresponding key, with the subscription being published on that network node which is responsible for the resource with this key. If resources with this key are published at the node responsible, a corresponding subscription leads to that node which has subscribed to the resource being informed about the presence of the resource. Subsequently, the node which was informed about the presence of the resource can look for the resource by a look-up known per se and retrieve this from the node at which the resource is located. If necessary, the resource can also be transferred simultaneously along with the information that this resource has been stored at a corresponding network node.

The above described mechanism of publication of resources and subscription to resources is sufficiently known for peer-to-peer systems and will also be referred to as a publish-subscribe mechanism. This publish-subscribe mechanism is used in an embodiment described herein to notify the assignment of logical addresses on the basis of which the automation system is engineered to physical addresses of the individual devices in the communication network. Here, the physical addresses are those addresses which, during real operation of the automation system, are used for addressing the individual devices and which make possible real-time operation, e.g., based on Industrial Ethernet. The physical addresses, depending on the design of the automation system, can be MAC addresses, IP addresses or similar. By contrast, the logical addresses have only been used in the development or within the framework of the engineering of the system but are not used during real operation of the system, however The method in accordance with the invention achieves the results of enabling automation systems to be developed generically on logical addresses where, before real operation is started, the assignment between the logical addresses and the actual physical addresses of the devices is undertaken and real-time operation of the system is guaranteed. Here, using an overlay network, the method in accordance with the invention permits devices added to the automation system or devices replacing other devices to be notified with their physical addresses in a simple manner using publish-subscribe mechanisms.

An embodiment of the inventive method based on FIG. 1 to FIG. 3 is described below for a communication between sensor S5, controller C1 and actuator A4. The controller C1 processes sensor data of the sensor S5 in this case with the aid of the control function and converts corresponding sensor data into control signals for the actuator A4. As previously described, the sensor S5, the controller C1 and the actuator A4 are part of a chord ring that spans the real-time automation network. The controller, the sensor and the actuator as well as all other devices of the ring shown in FIG. 1 are each given a unique identity and store those resources or subscriptions for the key of which they are responsible as a result of their identity in the ring. In addition, the controllers, sensors and actuators, as clients of the peer-to-peer network, can publish resources or subscriptions or search for them as described above. The individual devices can be connected directly to the automation network through corresponding communication nodes and thus form autonomous units with communication capabilities. There may also be the option that the devices are permanently wired to other components which, for their part, are connected to the automation network. In such cases, these components function for the devices wired to them as proxies and control their communication. Preferably, such devices, which are merely linked in indirectly via proxies to the automation network, are low-cost sensors or actuators without their own communication functionality.

The individual controllers, sensors and actuators in their turn can themselves be integrated into other modules or units, for example, into separate automation modules. In this case, a preferred application of the invention is communication in an automation system of modular construction in which the automation system is developed based on separate automation modules and then, based on these automation modules, is assembled and configured appropriately.

As previously described, the individual devices of the automation system or the services abstracting the devices each have respective logical addresses, on the basis of which the communication between the devices is described during engineering of the system. In this case, the logical address PA_C1 is allocated to the controller C1, the logical address LA_S5 is allocated to the sensor S5 and the logical address LA_A4 is allocated to the actuator. The controller C1 uses in a manner known per se a controller function $f_{controller}$, with which corresponding sensor data of the sensor S5 is converted into a control signal for the actuator A4. This means that $f_{controller}(SD) \rightarrow CS$ applies, with SD representing sensor data or a sensor value of the sensor S5 and CS representing a control signal resulting therefrom for the actuator A4. Within the framework of the interaction between the controller C1 and the sensor S5 or the actuator A4, the prerequisite is that the sensor and the actuator know their own logical addresses. Likewise, the controller knows its own logical address as well as the logical addresses of the sensor and of the actuator. In addition, the controller, the sensor and the actuator know their physical addresses. The physical address of the controller C1 is referred to as PA_C1 below, the physical address of the sensor S5 as PA_S5 and the physical address of the actuator A4 as PA_A4.

In the figures described below, a publication of a resource with the key and the resource content val is referred to by the designation PR(key, val). In addition PS(key, res) designates the publication of a subscription that a resource with the key with response address res. S(key) designates the search for the resource with the key. Furthermore the result of the search for a resource with the key is specified by R(key)=xy. The notification for a subscription to a resource with the key is designated by N(key). Furthermore, in the figures, a dashed box arranged at a node specifies a subscription SUB published at this node and a box represented by solid lines and assigned to a node specifies a resource RES stored at this node.

An embodiment of the method in accordance with the invention is illustrated with reference to FIG. 1 to FIG. 3, based on a push architecture in which, during operation of the automation system, sensor data is automatically sent from the sensor S5 to the controller C1. During creation of the communication links, it is therefore necessary for the sensor S5 to obtain the physical address of the controller C1. An explanation is given below of how, after the initialization or switching-on of the controller C1, of the sensor S5 and of the actuator A4, the communication links between these devices are established where, after creation of this link, communication between the devices is then undertaken as in a conventional Industrial Ethernet. When the sensor S5 is switched on, it then initially publishes in step S1 a subscription to a resource with its logical address L4_S5 as key, where the sensor S5 specifies itself as the subscribing network node with its physical address PA_S5. In the scenario of FIG. 1, the network node C3 is responsible for the key PA_S5, so that the subscription is published at this network node. Subsequently the sensor S5, in step S2, searches for a resource with its logical address LA_S5 as key, since after initialization it does not yet know whether a resource with the key LA_S5 is already stored in the peer-to-peer network. This resource is only published when the controller C1 is switched on or initialized. This is not yet the case in the scenario of FIG. 1, so that an empty search result NULL is returned in step S3 from the controller C3 to the sensor S5. After the actuator A4 is switched on, this publishes in the peer-to-peer network a normal resource with its logical address LA_A4 as key and its physical address PA_A4 as resource content (step S4). Since in the scenario of FIG. 1 the network node S2 is responsible for the key LA_A4, the publication is performed at this network node.

The method then continues in FIG. 2 such that the controller C1 is also switched on. This analyzes its control function $f_{controller}$ and establishes that data from sensor S5 of logical address LA_S5 is needed as input data in order, on the basis thereof, to transmit control signals to the actuator A4 with its logical address LA_A4. The control function that was created within the framework of the engineering only knows the logical addresses in such cases. The objective of the method in accordance with the presently contemplated embodiment is now the notification of corresponding physical addresses so that, during operation of the automation system in real time, the corresponding information can be transferred. In step S5, after being switched on, the controller C1 publishes a resource with the logical address LA_S5 of the sensor S5 as key and with its physical address PA_C1 as resource content at the node C3. The result of this publication is that the sensor S5, because of its subscription performed in step S1, is now informed about the presence of the resource stored in step S5. This is achieved via the notification N(LA_S5) performed in step S6. In the presently described embodiment, the content of the resource is not yet transferred with the notification. Therefore, the sensor S5, after receipt of the notification in step S7, looks for the corresponding published resource via its key LA_S5. In step S8, the resource content, in the form of the physical address PA_C1 of the controller C1, is then returned as a result to the sensor S5. Subsequently the sensor S5 can transfer its sensor data SD to the controller C1 directly via the physical address PA_C1 in real time, as is indicated by the step S9.

As emerges from FIG. 3, the controller C1 publishes during its initialization not only a resource with the logical sensor address LA_S5 as key but also a subscription to a resource with the logical address LA_A4 of the actuator A4 as key defined in the above controller function $f_{controller}$. This is performed in step S10. The network node S2 is responsible for logical address LA_A4. As a result, the publication occurs at this network node. This subscription ensures that the controller C1 can also find out the physical address of the actuator A4 if the actuator is not switched on until after the controller C1 and its physical address is then published under the logical address (see above step S4). In the event of the actuator A4 thus being initialized after the controller C1, after the subscription in step S10, a notification is transferred in step S11, with which the controller C1 is informed that a resource with the key of the logical actuator address LA_A4 has been stored on the node S2. The controller C1 then searches in step S12 for this resource and obtains as the result in step S13 the physical address PA_A4 of the actuator A4, after which the controller C1 can transfer the control signals CS produced from its control function $f_{controller}$ to the actuator A4 using its physical address, as indicated by step S14.

Should the actuator A4 already be switched on during the execution of step S10, the controller C1 itself automatically initiates a search for the resource with the logical address LA_A4, so that the controller C1 also receives the physical address of the actuator in this case. If necessary, there is also the possibility for the subscriptions as described above to always be developed so that a notification to the subscribing network code is returned even if, during publication of the subscription, a correspondingly published resource is already present at the network node. In this case, the subscribing node must only initiate a search after the publication of the subscription if it receives a notification. As already mentioned above, the search can also be dispensed with entirely if the resource content is also transferred at the same time in the notification.

Where the controller needs data from a number of logical sensors or has to transfer signals to a number of actuators, the steps described above can be performed for each sensor or each actuator. Provided the data of a logical sensor is needed by a number of controllers, the sensor would be informed as a result of multiple publications by different controllers about the physical addresses of the different controllers, so that the logical sensor can send its sensor data to all these different controllers. As soon as a sensor knows the physical address of a controller, any given application protocol can be initialized between the sensor and the controller, e.g., a protocol for exchange of communication parameters. This protocol precedes the actual sending of the sensor data.

Within the framework of the communication between the controller and an actuator, control signals may also be transferred to a number of actuators, which is achieved by the controller publishing a subscription to each logical address of the actuator. Similarly to the communication between sensor and controller, after the transfer of the physical address of the actuator to the controller, any given application protocol between the control and the actuator, e.g., for exchanging communication parameters, can be established. This protocol precedes the actual sending of the control signals to the actuator.

If a sensor is replaced in the automation system by a new one as a result of an outage, the disclosed embodiments of the method in accordance with the invention ensures that the new sensor, as a result of the subscription to a resource with its own logical sensor address as key, obtains the physical address of the controller. If the controller is replaced by a new controller or if tasks of the controller are taken over by a controller of another automation module, the above described method ensures that, by the publication of a resource under the logical address of the sensor, the physical address of the new controller is notified to the sensor. In addition, a new controller can obtain the physical address of the actuator via subscription to a resource with the logical address of the actuator.

If an actuator fails in the communication network or if actuator is replaced by another actuator with another physical address, the new actuator publishes a new physical address by the publication of a corresponding resource of its logical address as key and its physical address as resource content. The controller holds a subscription to the logical actuator address. As a result, it is notified about the address and thus obtains the physical address of the new actuator.

A push architecture, in which the sensor S5 itself autonomously transfers sensor data to the controller C1 has been described above with reference to FIG. 1 to FIG. 3. In an embodiment, it is also possible that, instead of a push architecture, a poll architecture is employed in which the controller retrieves or requests the sensor data from the sensor. In this case, the sensor behaves in a similar way to the actuator in the method described above. The major steps for creating communication links in a poll architecture for the sensor S5, the controller C1 and the actuator A4 will be explained below.

If the sensor S5 is switched on, instead of a subscription, it publishes in the peer-to-peer network a normal resource with its logical address LA_S5 as key and its physical address PA_S5 as resource content. The actuator behaves in a way similar to the way that it behaves in push architecture and publishes in the network at switch-on a normal resource with its logical address LA_A4 as key and its physical address PA_A4 as resource content. The controller in its turn analyzes its control function $f_{controller}$ after being switched on and establishes that it must fetch sensor data from the sensor S5 with the logical address LA_S5 to determine corresponding control signals from send data that it must then transfer to the actuator with the logical address LA_A4. In order to achieve this, the controller S5 publishes a subscription in the network with the logical sensor address LA_S5 defined in the control function as key. This subscription ensures that the controller can also obtain the physical address of the sensor S5 if the sensor S5 is not switched on until after the controller and its physical address is then published under the logical sensor address LA_S5.

Finally, the controller C1 starts a search in the peer-to-peer network for a resource with the logical sensor address LA_S5 defined in the control function. Where the sensor S5 was started before the controller C1, the controller receives as a result of this search the resource published by the sensor with a physical address of the sensor as content. Based on this physical address, the controller can then, within the framework of the poll architecture, continue to fetch sensor data from the sensor S5. Where the sensor S5 has not yet been started, the controller must wait until, after the start of the sensor, it receives the notification for its subscription and then receives the logical address of the sensor S5 via this.

Similarly to the method in accordance with FIG. 1 to FIG. 3, the controller C1 publishes in the peer-to-peer network a subscription with the logical actuator address LA_A4 defined in its control function $f_{controller}$ as key. This subscription ensures that the controller can also obtain the physical address PA_A4 of the actuator A4 even if the actuator is only switched on after the controller and then publishes its physical address under the logical actuator address. Subsequently, the controller starts a search in the peer-to-peer network resource with the logical actuator address LA_A4 defined in the control function as key. Provided the corresponding actuator has been initialized before the controller, the controller receives as a result of this search the resource published by the actuator with a physical address of the actuator as resource content. The controller can then send its control signals to this actuator address from then on. Provided the corresponding actuator has not yet been started, the controller must wait until it receives a notification to its subscription after the start of the actuator and then can receive the physical actuator address.

The above described embodiments of method in accordance with the invention exhibit a series of advantages. In particular, the logical addresses and communication links between devices of the automation system defined within the framework of the engineering of the automation system can be resolved into physical addresses during start-up of the system and dedicated, real-time-capable physical communication connections can be established in this way. Thus, the physical addresses of those devices to which data is to be sent or from which data is to be fetched no longer have to be configured as part of the engineering of the automation system, which simplifies the engineering. Corresponding sensors and actuators in the automation system only have to know their logical sensor or actuator address as well as their own physical address. A controller only has to know its own physical address and the logical sensor and actuator addresses contained in its control function. On failure of a device in the automation system, the failed device can be replaced without reconfiguration of other elements, even if the replacement device has a different physical address. On failure or during an overload of the controller, a control function can also be performed by another controller with another physical address.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for creating a communication network from devices of an automation system, comprising:
developing the automation system based on logical addresses of the devices; and
assigning to the devices physical addresses by which the devices are accessed over the communication network for exchange of data during operation of the automation system;
constructing an overlay network comprising a decentralized network between the devices, each of the devices in the decentralized network representing a network node responsible for a plurality of keys, and resources in the decentralized network are specified by a respective key assigned to a resource and a resource content, wherein subscriptions to the resources, which are specified by the respective keys assigned to the resource and a subscribing device, are published;
wherein at the one of the network nodes responsible for the respective key of the resource, the resource or a subscription to the resource is published, and for a subscription to the resource a subscribing device of the devices is informed, on publication of the resource, with the key of the subscription about the resource content;
wherein each of the devices is accepted into the decentralized network as a network node during an initialization and functions as at least one of a first and a second device;
wherein, during operation of the automation system, data at each first device is sendable to one of the second devices by the communication network or data at the one of the second devices is retrievable for each first device;
wherein, during initialization of each first device, a subscription to a resource with a logical address as key and each first device as subscribing device is published; and
wherein, during initialization of the one of the second devices, a resource with a same logical address in accordance with a subscription to the resource during the initialization of each first device and with a physical address of the one of the second devices as resource content is published.

2. The method as claimed in claim 1, wherein each first device, during its initialization, publishes a subscription to a resource with its logical address as the key; and wherein the one of the second devices to which data on each first device is sendable or the data of which is retrievable for each first device, publishes during its initialization the resource with the logical address of each first device as the key and with the physical address of the one of the second devices as the resource content.

3. The method as claimed in claim 1, wherein each first device, during its initialization, publishes the subscription to the resource with the logical address of the one of the second devices to which data on each first device is sendable or the data of which is retrievable for each first device as the key; and wherein the one of the second devices, during its initialization, publishes the resource with its logical address as the key and with its physical address as the resource content.

4. The method as claimed in claim 2, wherein each first device, during its initialization, publishes the subscription to the resource with the logical address of the one of the second devices to which data on each first device is sendable or the data of which is retrievable for each first device as the key; and wherein the one of the second devices, during its initialization, publishes the resource with its logical address as key and with its physical address as the resource content.

5. The method as claimed in claim 1, wherein the subscribing device is specified in the subscription by its physical address.

6. The method as claimed in claim 1, wherein the method is implemented in an automation system in which the devices comprise a sensor, an actuator and a controller, wherein during operation of the automation system based on physical addresses of at least some of the devices, sensor data on the sensor is sendable to the controller or is retrievable for the controller and control signals based on the sensor data are sendable by the controller to the actuator.

7. The method as claimed in claim 6, wherein, the controller includes a control function with which, based on the sensor data received in the controller, the control signals sendable to the actuator are determined; and wherein the control function is based on the logical address of the sensor and the logical address of the actuator.

8. The method as claimed in claim 6, wherein the sensor and the controller are initialized for operation during which the sensor data on the sensor is sendable to the controller; wherein the sensor, on its initialization, functions as one of the first devices and publishes the subscription to the resource with its logical address as the key; and wherein the controller functions as the one of the second devices and publishes the resource with the logical address of the sensor as the key and with the physical address of the controller as the resource content.

9. The method as claimed in claim 7, wherein the sensor and the controller are initialized for operation during which the sensor data on the sensor is sendable to the controller; wherein the sensor, on its initialization, functions as one of the first devices and publishes the subscription to the resource with its logical address as the key; and wherein the controller functions as the one of the second device and publishes the resource with the logical address of the sensor as the key and with the physical address of the controller as the resource content.

10. The method as claimed in claim 6, wherein the sensor and the controller are initialized for operation during which the sensor data on the sensor is retrieved for the controller; and wherein the controller on its initialization, functions as one of the first devices and publishes the resource with the logical address of the sensor as the key; and wherein the sensor functions as the one of the second devices and publishes the resource with its logical address as the key and with its physical address as the resource content.

11. The method as claimed in claim 6, wherein the actuator and the controller are initialized for operation during which the control signals are sent from the controller to the actuator; wherein the controller, on its initialization, functions as one of the first devices and publishes a subscription to a resource with the logical address of the actuator as the key; and wherein the actuator functions as the one of the second devices and publishes the resource with its logical address as the key and its physical address as the resource content.

12. The method as claimed in claim 1, wherein the decentralized network comprises a peer-to-peer network based on a distributed hash table.

13. The method as claimed in claim 1, wherein the communication network is based on Industrial Ethernet or Profinet for exchange of data during operation of the automation system.

14. The method as claimed in claim 1, wherein the physical addresses of the devices comprise media access control (MAC) addresses or IP addresses.

15. The method as claimed in claim 12, wherein the hash table is a chord ring.

16. A communication network comprising:

devices of an automation system configured based on logical addresses of the devices, the devices being assigned respective physical addresses by which the devices are addressed to exchange data over the communication network during operation of the automation system, wherein the communication network comprises:

an overlay network in the form of a decentralized network constructed between the devices, each of the devices in the decentralized network representing a network node responsible for a plurality of keys, and resources in the decentralized network are specified by a respective key assigned to a resource and a resource content, wherein subscriptions to the resources, which are specified by the respective keys assigned to the resource and a subscribing device, are published;

wherein at the one of the network nodes responsible for the respective key of the resource, the resource or a subscription to the resource is published, and for a subscription to the resource a subscribing device of the devices is informed, on publication of the resource, with the key of the subscription about the resource content;

wherein each of the devices is accepted into the decentralized network as a network node during an initialization and functions as at least one of a first and a second device;

wherein, during operation of the automation system, data at each first device is sendable to one of the second devices by the communication network or data at the one of the second devices is retrievable for each first device;

wherein, during initialization of each first device, a subscription to a resource with a logical address as key and each first device as subscribing device is published; and wherein, during initialization of the one of the second devices, a resource with a same logical address in accordance with a subscription to the resource during the initialization of each first device and with a physical address of the one of the second devices as resource content is published.

17. The communication network as claimed in claim 16, wherein each first device, during its initialization, publishes a subscription to a resource with its logical address as the key; and wherein the one of the second devices to which data on each first device is sendable or the data of which is retrievable for each first device, publishes during its initialization the resource with the logical address of each first device as the key and with the physical address of the one of the second devices as the resource content.

18. An automation system including a plurality of devices, and a communication network as claimed in claim 16 formed between the plurality of devices.

* * * * *